US011295015B1

(12) United States Patent
Roundy et al.

(10) Patent No.: US 11,295,015 B1
(45) Date of Patent: Apr. 5, 2022

(54) IDENTIFYING AND PROTECTING AGAINST SURVEILLANCE APPS INSTALLED ON CLIENT DEVICES

(71) Applicant: SYMANTEC CORPORATION, Mountain View, CA (US)

(72) Inventors: Kevin Alejandro Roundy, El Segundo, CA (US); Acar Tamersoy, Culver City, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 357 days.

(21) Appl. No.: 16/286,050

(22) Filed: Feb. 26, 2019

(51) Int. Cl.
| | |
|---|---|
| G06F 21/56 | (2013.01) |
| G06F 21/55 | (2013.01) |
| G06F 21/53 | (2013.01) |
| H04L 29/06 | (2006.01) |
| G06F 8/61 | (2018.01) |

(52) U.S. Cl.
CPC ............ G06F 21/567 (2013.01); G06F 21/53 (2013.01); G06F 21/554 (2013.01); G06F 21/568 (2013.01); H04L 63/10 (2013.01); G06F 8/62 (2013.01); G06F 2221/033 (2013.01)

(58) Field of Classification Search
CPC ...... G06F 21/56; G06F 21/562; G06F 21/567; G06F 21/568; G06F 21/53; G06F 21/554; G06F 21/577; G06F 2221/033; G06F 8/62; H04L 63/10
See application file for complete search history.

(56) References Cited

U.S. PATENT DOCUMENTS

| | | | |
|---|---|---|---|
| 8,832,840 B2 * | 9/2014 | Zhu | G06F 21/577 726/25 |
| 9,178,901 B2 | 11/2015 | Xue et al. | |
| 9,848,010 B2 * | 12/2017 | Bolgert | H04L 63/1416 |
| 10,116,680 B1 * | 10/2018 | Han | G06F 21/566 |
| 10,482,250 B1 * | 11/2019 | Joshi | G06F 21/55 |
| 10,715,542 B1 * | 7/2020 | Wei | G06F 16/958 |

(Continued)

OTHER PUBLICATIONS

Chatterjee, R. et al.; "The Spyware Used in Intimate Partner Violence"; located at: https://www.ipvtechresearch.org/pubs/spyware.pdf; accessed on Feb. 26, 2019; 18 pages.

(Continued)

Primary Examiner — Linglan E Edwards
(74) Attorney, Agent, or Firm — Maschoff Brennan (57) ABSTRACT

Identifying and protecting against malicious apps installed on client devices. In some embodiments, a method may include (a) identifying client devices, (b) identifying apps installed on the client devices, (c) assigning each of the apps known to be a malicious app with a highest app suspicion score, (d) assigning each of the other apps as an unknown app with a lowest app suspicion score, (e) assigning each of the client devices with a device suspicion score, (f) assigning each of the unknown apps with an updated app suspicion score, (g) repeating (e), and repeating (f) with a normalization, until the device suspicion scores and the app suspicion scores converge within a convergence threshold, (h) identifying one of the unknown apps as a malicious app, and (i) protecting against the malicious app by directing performance of a remedial action to protect the client device from the malicious app.

17 Claims, 4 Drawing Sheets

(56) References Cited

U.S. PATENT DOCUMENTS

| | | | |
|---|---|---|---|
| 2013/0111592 A1* | 5/2013 | Zhu | G06F 21/577 |
| | | | 726/25 |
| 2017/0149815 A1* | 5/2017 | Bolgert | H04L 63/1425 |
| 2018/0176241 A1 | 6/2018 | Manadhata et al. | |
| 2019/0007455 A1 | 1/2019 | Sheng | |

OTHER PUBLICATIONS

Letham B. and Rudin C.; "15.097: Probabilistic Modeling and Bayesian Analysis"; located at: https://ocw.mit.edu/courses/sloan-school-of-management/15-097-prediction-machine-learning-and-statistics-spring-2012/lecture-notes/MIT15_097S12_lec15.pdf; accessed on Feb. 26, 2018; 42 pages.

Steorts, R. C.; "Module 1: Introduction to Bayesian Statistics, Part 1"; located at: http://www2.stat.duke.edu/~rcs46/modern_bayes17/lecturesModernBayes17/lecture-1/01-intro-to-Bayes.pdf; accessed on Feb. 26, 2019; 25 pages.

Tong, H., Christos, F., and Pan, J.; "Fast random walk with restart and its applications"; In Sixth International Conference on Data Mining (ICDM'06); pp. 613-622; IEEE, 2006; 10 pages.

Tong, H., Christos F., and Pan, J.; "Random walk with restart: fast solutions and applications"; Knowledge and Information Systems 14, No. 3 (2008); 327-346; 20 pages.

Chau, D. et al.;"Polonium: Tera-scale graph mining and inference for malware detection"; In Proceedings of the 2011 SIAM International Conference on Data Mining, pp. 131-142' Society for Industrial and Applied Mathematics; 2011; 12 pages.

Yoo, J., Jo, S. & Kang, U.; Nov. 2017; "Supervised Belief Propagation: Scalable Supervised Inference on Attributed Networks"; In Data Mining (ICDM), 2017 IEEE International Conference on (pp. 595-604); IEEE; 10 pages.

Bengio, Y. et al.; "11 Label Propagation and Quadratic Criterion"; located at: https://www.researchgate.net/profile/Y_Bengio/publication/238675708_Label_Propagation_and_Quadratic_Criterion/links/0f3175320aae4ada34000000/Label-Propagation-and-Quadratic-Criterion.pdf?origin=publication_detail; 2006; accessed on Feb. 26, 2019; 26 pages.

Zhu, X. and Ghahramani, Z.; "Learning from Labeled and Unlabeled Data with Label Propagation"; located at: http://mlg.eng.cam.ac.uk/zoubin/papers/CMU-CALD-02-107.pdf; 2002; accessed on Feb. 26, 2019; 19 pages.

Gensim; "models-lsimodel-Latent Semantic Indexing"; URI: https://radimrehurek.com/gensim/models/lsimodel.html; Nov. 1, 2019; pp. 1-8.

Havron et al.; "Clinical Computer Security for Victims of Intimate Partner Violence"; URL: https://www.usenix.org/conference/usenixsecuirty19/presentation/havron; Proceedings of the 28th USENIX Security Symposium; Aug. 14-16, 2019.

Freed et al.; "A Stalkers Paradise: How Intimate Partner Abusers Exploit Technology"; URL: https://rist.tech.cornell.edu/papers/stalkers-paradise-intimate.pdf; ACM Conference on Human Factors in Computing Systems; Apr. 21-26, 2018; 13 pages.

Roundy et al.; "The Many Kinds of Creepware Used for Interpersonal Attacks"; IEEE Symposium on Security and Privacy; May 17, 2020; 21 pages.

* cited by examiner

IDENTIFYING AND PROTECTING AGAINST SURVEILLANCE APPS INSTALLED ON CLIENT DEVICES

BACKGROUND

Modern computers and computer networks are subject to a variety of security threats. For example, malicious apps (also known as malicious applications) are software intentionally designed to cause damage to a computer device or computer network. Malicious apps typically do damage after they are installed on a computer device.

One form of malicious app is a surveillance app (also known as a privacy-invasive app) which is specifically designed to be used in surveilling a user of a computer device, or data on the computer device, without the user's knowledge. In some situations, a surveillance app may be covertly installed by an abuser on a computer device (e.g., a smartphone) of a victim to enable the abuser to surveil all communications and other forms of data sent to, received by, and stored on the victim's computer device.

Unfortunately, it can be difficult to detect surveillance apps and other malicious apps installed on a computer device. The difficulty in detecting surveillance apps installed on computer devices can leave these computer devices, and their users, vulnerable to abusers who may exploit surveillance data obtained from surveillance apps.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and protecting against malicious apps installed on client devices may be at least partially performed by a computer device including one or more processors. The method may include (a) identifying client devices, (b) identifying apps installed on the client devices, (c) assigning each of the apps known to be a malicious app with a highest app suspicion score, (d) assigning each of the other apps as an unknown app with a lowest app suspicion score, (e) assigning each of the client devices with a device suspicion score equal to a maximum app suspicion score of the identified apps installed on the client device, (f) assigning each of the unknown apps with an updated app suspicion score, (g) repeating (e), and repeating (f) with a normalization, until the device suspicion scores and the app suspicion scores converge within a convergence threshold, (h) identifying one of the unknown apps as a malicious app based on the app suspicion score of the unknown app exceeding a suspicion threshold, and (i) in response to identifying the malicious app, protecting against the malicious app by directing performance, at one of the client devices upon which the malicious app is installed, of a remedial action to protect the client device from the malicious app.

In some embodiments, the performing, at one of the client devices upon which the malicious app is installed, of a remedial action may include one or more of blocking the client device from accessing a network, rolling back one or more changes at the client device that were made by the malicious app, quarantining the malicious app on the client device, uninstalling the malicious app from the client device, or temporarily freezing activity at the client device, or some combination thereof.

In some embodiments, the normalization performed during each repeat performance of (f) may include normalizing the app suspicion scores assigned during each repeat performance of (f) so that a sum of the app suspicion scores assigned during each repeat performance of (f) is equal to a sum of the app suspicion scores assigned during an initial performance of (f).

In some embodiments, the highest app suspicion score may be 1 and the lowest app suspicion score may be 0. In these embodiments, the convergence threshold may be four decimal places.

In some embodiments, the suspicion threshold may include a threshold in a ranking of the app suspicion scores of the unknown apps.

In some embodiments, the performance of (f) may include assigning each of the unknown apps with an app suspicion score equal to a fraction that comprises a numerator based on a sum of the device suspicion scores of the client devices upon which the unknown app is installed and a denominator based on a number of the client devices upon which the unknown app is installed. In these embodiments, the fraction may include a fraction determined using an Empirical Bayes Estimation. Also, in these embodiments, the fraction may further include a relatively small constant added to the numerator and a relatively large constant added to the denominator in order to avoid false positives.

In some embodiments, the performance of (f) may include assigning each of the unknown apps with an app suspicion score equal to an average device suspicion score of the client device(s) upon which the unknown app is installed. In these embodiments, between the performance of (g) and (h), the method may further include assigning each of the unknown apps with an app suspicion score equal to a fraction that includes a numerator based on a sum of the device suspicion scores of the client devices upon which the unknown app is installed and a denominator based on a number of the client devices upon which the unknown app is installed. In these embodiments, the fraction may include a fraction determined using an Empirical Bayes Estimation. Also, in these embodiments, the fraction may further include a relatively small constant added to the numerator and a relatively large constant added to the denominator in order to avoid false positives.

In some embodiments, the malicious app may be a surveillance app.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Security threats to computer devices and computer networks can be difficult to detect. For example, it can be difficult to detect whether an unknown app installed on a computer device is a surveillance app or other malicious app.

For example, surveillance apps may be difficult to detect based on static analysis of file properties and marketplace metadata because there may be many legitimate apps that share similar data with corporations for inoffensive purposes, and it may not be easy to isolate apps that forward sensitive data to an abuser. Furthermore, there may be tremendous variety in the functionality of these apps. Tools for static taint-flow analysis may be as likely to find vulnerable apps as surveillance apps. Dynamic analysis may be extremely challenging as surveillance functionality may be typically either locked behind a pay-wall or may only occur once a user has set up forwarding information for surveillance data and footage.

Detecting surveillance apps may also be a challenging problem because relatively few apps may be used exclusively for this purpose, resulting in a relatively small ground truth set. This may result in a presumption that the vast majority of apps are benign from the perspective of being privacy-invasive in a non-authorized sense.

The difficulty in detecting surveillance apps installed on computer devices can leave these computer devices, and their users, vulnerable to abusers who may exploit surveillance data obtained from surveillance apps.

Some embodiments disclosed herein may provide various benefits. In particular, some embodiments disclosed herein may, for example, enable identifying and protecting against surveillance apps installed on client devices.

In some embodiments, a privacy app installed on a remote server device and/or installed on a local client device may identify client devices and may identify apps installed on the client devices. Next, the privacy app may then assign each app known to be a surveillance app with a highest app suspicion score (e.g., a score of 1) and assign all other unknown apps with a lowest app suspicion score (e.g., a score of 0). Then, the privacy app may perform a two-step process of (1) assigning each client device with a device suspicion score equal to a maximum app suspicion score of the identified apps installed on the client device and (2) assigning each unknown app with an app suspicion score based on the device suspicion scores. Next, the privacy app may repeat the two-step process of (1) assigning device suspicion scores and (1) app suspicion scores (which may include normalization) until the device suspicion scores and the app suspicion scores converge within a convergence threshold (e.g., within two or four decimal places). Then the privacy app may optionally eliminate false positives by assigning each unknown app with an app suspicion score based on an Empirical Bayes Estimation. Finally, the privacy app may identify one of the unknown apps as a surveillance app based on the app suspicion score of the unknown app exceeding a suspicion threshold (e.g., a suspicion threshold of the top 0.05% of app suspicion scores) and, in response, protect against the surveillance app by directing performance, at one of the client devices upon which the surveillance app is installed, of a remedial action to protect the client device from the surveillance app.

Some embodiments disclosed herein may enable more accurate detection of surveillance apps than was possible using conventional methods. This more accurate detection of surveillance apps installed on computer devices can enable remedial actions to be taken to protect these computer devices, and their users, from abusers being able to access and exploit surveillance data obtained from surveillance apps.

Although some embodiments of the methods disclosed herein are disclosed as being employed in connection with identifying and protecting against surveillance apps installed on client devices, it is understood that identifying surveillance apps is only one of countless practical applications for the methods disclosed herein. For example, the methods disclosed herein may be employed in other practical applications, such as in identifying and protecting against other types of malicious apps, including malicious apps which may be, or which may include the functionality of, one or more of a spyware, a virus, a worm, a logic bomb, a trapdoor, a Trojan horse, a Remote Admin Trojan (RAT), a mobile malicious code, a malicious font, or a rootkit. Some malicious apps are abusive apps which enable harassment of victims. Similarly, some malicious apps are entrapment-focused, such as apps that are configured to bait a suspected cheating partner into a compromising response. Other malicious apps are device lockdown apps, which enable the cutting of network access of the disabling of a keyboard. Therefore, the methods disclosed herein are not limited to being employed in connection with identifying and protecting against surveillance apps, but may also or instead be employed in any other practical application.

Figure 1:
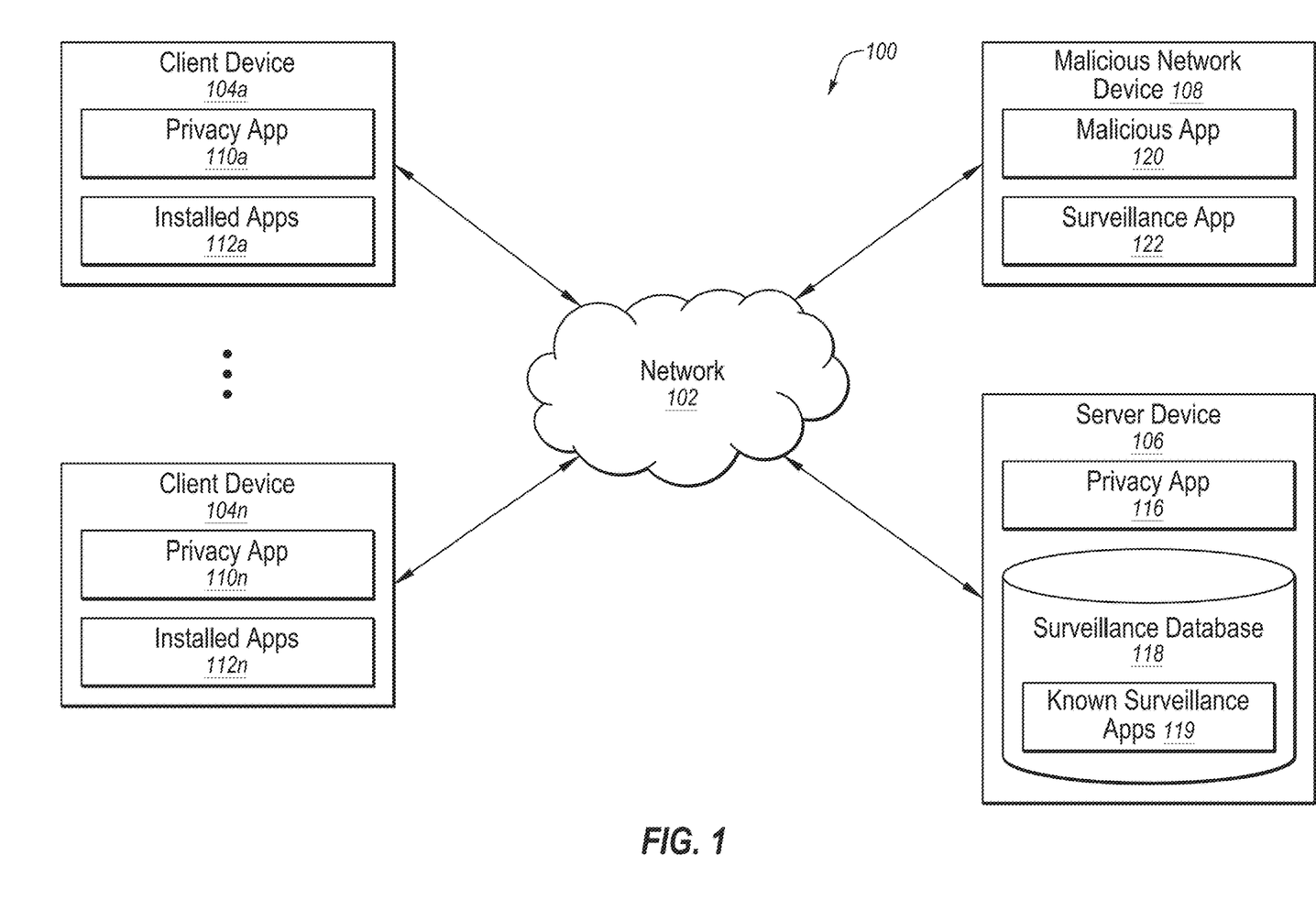
FIG. 1 illustrates an example system configured for identifying and protecting against surveillance apps installed on client devices.

Turning to the figures, FIG. 1 illustrates an example system 100 configured for identifying and protecting against surveillance apps installed on client devices. The system 100 may include a network 102, client devices 104a-104n, a server device 106, and a malicious network device 108.

In some embodiments, the network 102 may be configured to communicatively couple the client devices 104a-104n, the server device 106, and the malicious network device 108 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
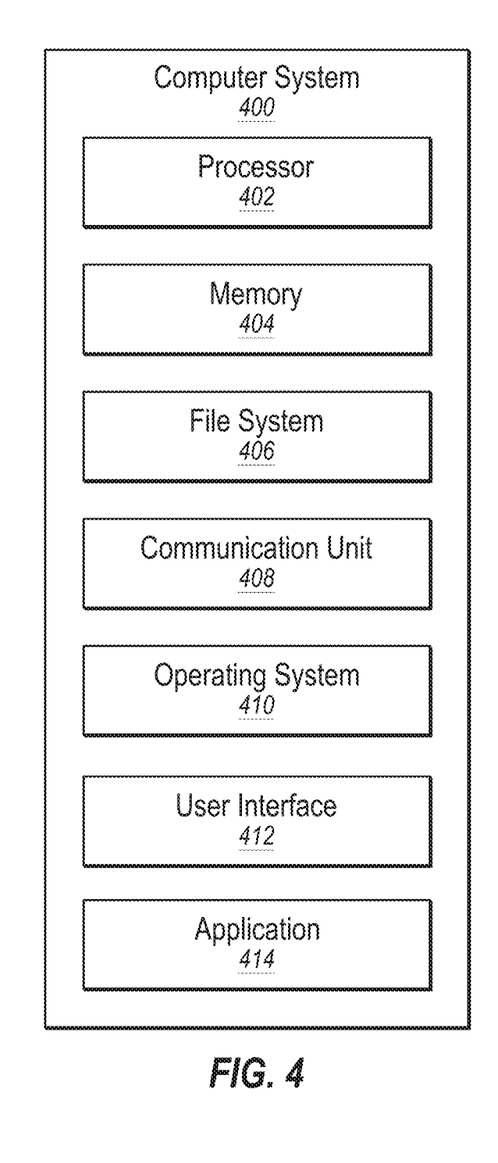
FIG. 4 illustrates an example computer system that may be employed in identifying and protecting against surveillance apps installed on client devices.

In some embodiments, the malicious network device 108 may be any computer system capable of communicating over the network 102 and capable of executing a malicious app 120 that attempts to infect other network devices with a surveillance app 122 or other malicious app, or otherwise attack other network devices, examples of which are disclosed herein in connection with the computer system 400 of FIG. 4. In some embodiments, the surveillance app 122 may be specifically designed to be used in surveilling a user of a computer device, or data on the computer device, without the user's knowledge. For example, the surveillance app may be configured to be covertly installed by an abuser on a computer device of a victim (e.g., on any of the client devices 104a-104n) to enable the abuser to surveil all communications and other forms of data sent to, received by, and stored on the victim's computer device. Examples of surveillance apps may be apps configured to enable an abuser to access photos, text messages, emails, call logs, browser history, individual keystrokes, a microphone, a camera, or some combination thereof on a victim's computer device, all without the victim's knowledge or consent.

In some embodiments, each of the client devices 104a-104n may be any computer system capable of communicating over the network 102 and capable of executing a privacy app, examples of which are disclosed herein in connection with the computer system 400 of FIG. 4. The client devices 104a-104n may include privacy apps 110a-110n, respectively. The privacy apps 110a-110n may be configured to implement one or more actions of the methods disclosed herein. For example, the privacy apps 110a-110n may be configured to identify installed apps 112a-112n and then send a list of these installed apps for each client device to a corresponding privacy app 116 on the server device 106. Further, if any of the installed apps 112a-112n are identified by the privacy app 116 as being a surveillance app, the privacy apps 110a-110n may be configured to perform a remedial action to protect the corresponding client device from the surveillance app. This remedial action may include, for example, blocking the corresponding client device from accessing the network 102 network, rolling back one or more changes at the corresponding client device that were made by the surveillance app, quarantining the surveillance app on the corresponding client device, uninstalling the surveillance app from the corresponding client device, or temporarily freezing activity at the corresponding client device, or some combination thereof.

In some embodiments, the server device 106 may be any computer system capable of communicating over the network 102 and capable of executing the privacy app 116, examples of which are disclosed herein in connection with the computer system 400 of FIG. 4. The privacy app 116 may be configured to implement one or more actions of the methods disclosed herein. For example, the privacy app 116 may be configured to identify the client devices 104a-104n and identify the installed apps 112a-112n installed on the client devices 104a-104n. Next, the privacy app 116 may then initially sort the installed apps 112a-112n into two categories: (1) apps known to be surveillance apps, and (2) unknown apps. The privacy app 116 may accomplish this initial sorting using a surveillance database 118, which stores a list of known surveillance apps 119, including identifying information for these known surveillance apps such as app name, app signature, app features, etc. The privacy app 116 may therefore initially sort the installed apps 112a-112n into the categories of (1) apps known to be surveillance apps, and (2) unknown apps, by comparing the installed apps 112a-112n to the list of known surveillance apps 119. The privacy app 116 may then assign each of the installed apps 112a-112n that is known to be a surveillance app with a highest app suspicion score (e.g., a score of 1, or a score of 100%) and assign all other unknown apps with a lowest app suspicion score (e.g., a score of 0, or a score or 0%). Then, the privacy app 116 may perform a two-step process of: (1) assigning each of the client devices 104a-104n with a device suspicion score equal to a maximum app suspicion score of the identified apps installed on the client device and (2) assigning each unknown app with an app suspicion score based on the device suspicion scores, as discussed in greater detail in connection with FIG. 2. Next, the privacy app 116 may repeat the two-step process of: (1) assigning device suspicion scores and (2) app suspicion scores (which may include normalization) until the device suspicion scores and the app suspicion scores converge within a convergence threshold (e.g., within two, three, or four decimal places). Then privacy app 116 may optionally eliminate false positives by assigning each unknown app with an app suspicion score based on an Empirical Bayes Estimation. Finally, the privacy app 116 may identify one of the unknown apps as a surveillance app based on the app suspicion score of the unknown app exceeding a suspicion threshold (e.g., a suspicion threshold of the top 0.05%, 0.1%, or 0.2% of app suspicion scores) and, in response, protect against the surveillance app by directing performance, at one of the client devices 104a-104n upon which the surveillance app is installed, of a remedial action to protect the client device from the surveillance app (which directing may be performed in connections with one of the privacy apps 110a-110n).

Therefore, the privacy apps 110a-110n and 116 may cooperate to identify and protect against surveillance apps installed on the client devices 104a-104n. This identification may be more accurate than was possible using conventional methods. This more accurate detection of surveillance apps installed on the client devices 104a-104n can enable remedial actions to be taken to protect these client devices 104a-104n, and their users, from abusers being able to access and exploit surveillance data obtained from surveillance apps.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
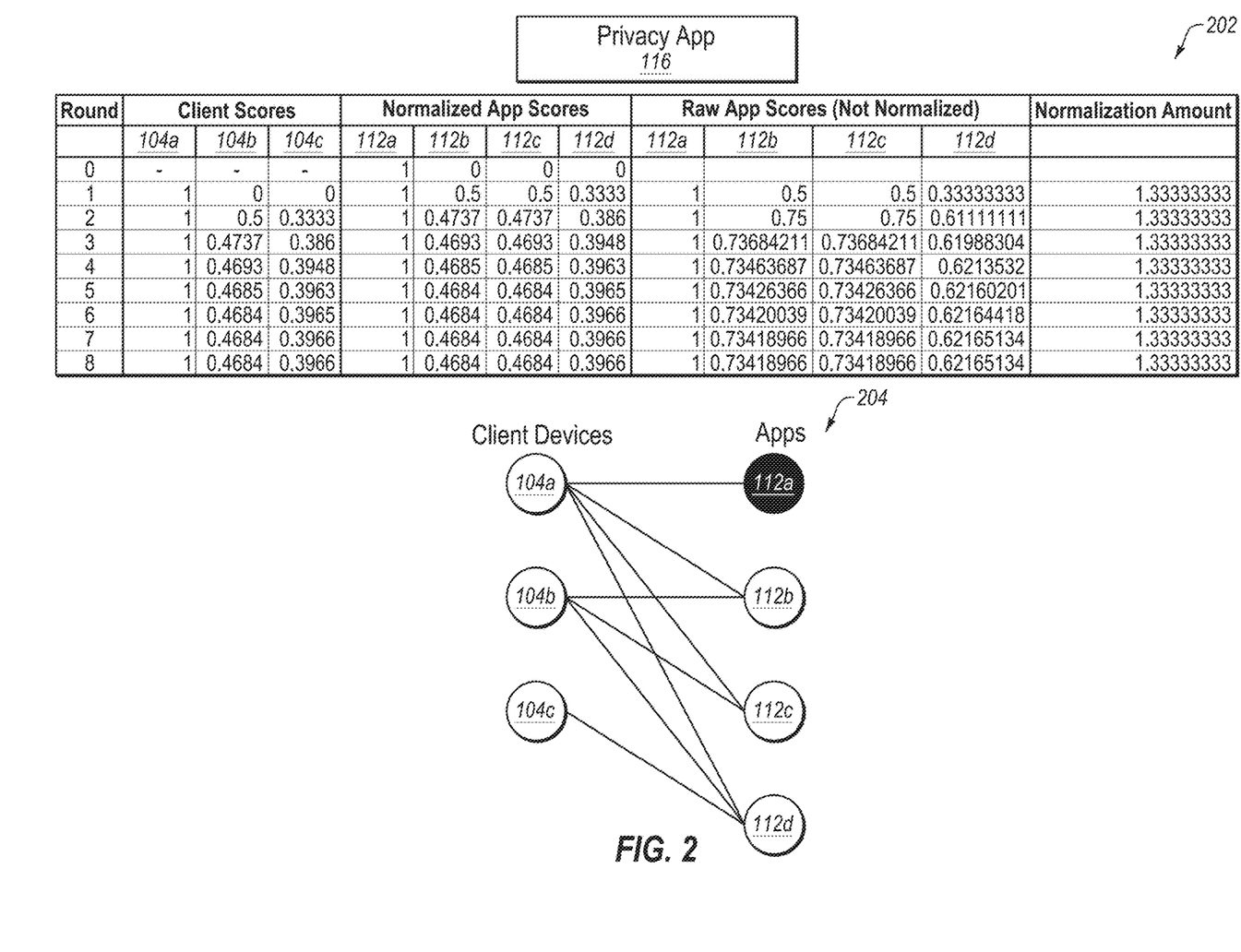
FIG. 2 is a flowchart illustrating aspects of identifying and protecting against surveillance apps installed on client devices.

FIG. 2 is a flowchart 200 illustrating aspects of identifying and protecting against surveillance apps installed on client devices. In particular, the flowchart 200 discloses how device suspicion scores and app suspicion scores may be iteratively assigned to client devices 104a, 104b, and 104c for apps 112a, 112b, 112c, and 112d until the device suspicion scores and app suspicion scores converge within a convergence threshold (e.g., four decimal places). The actions disclosed in FIG. 2 may be performed by a privacy app, such as by the privacy app 116.

As disclosed in the table 202 of FIG. 2, the privacy app 116 may identify client devices 104a-104c and may identify apps 112a-112d installed on the client devices 104a-104c, as disclosed in the chart 204 of FIG. 2. In particular, as disclosed in the chart 204, the privacy app 116 may identify that the client device 104a has apps 112a, 112b, 112c, and 112d installed thereon, the client device 104b has apps 112b, 112c, and 112d installed thereon, and the client device 104c has app 112d installed thereon. In some embodiments, the apps identified may only be a subset of all the apps installed on a client device, such as a subset that include only the apps that were installed within a certain period of time.

Next, the privacy app 116 may then assign each app known to be a surveillance app with a highest app suspicion score (e.g., a score of 1) and assign all other unknown apps with a lowest app suspicion score (e.g., a score of 0). In this example, the privacy app 116 may compare the apps 112a-112d to the list of known surveillance apps 119 in FIG. 1, and determine that only the app 112a is a known surveillance app, while the apps 112b, 112c, and 112d are unknown apps, meaning that it is unknown whether the apps 112b, 112c, and 112d are surveillance aps. Next, the privacy app 116 may then assign each app known to be a surveillance app (e.g., the app 112a) with a highest app suspicion score (e.g., a score of 1), and assign all other unknown apps (e.g., the apps 112b, 112c, and 112d) with a lowest app suspicion score (e.g., a score of 0), as disclosed in round 0 of the table 202.

Next, the privacy app 116 may perform a two-step process of (1) assigning each of the client devices 104a-104c with a device suspicion score equal to a maximum app suspicion score of the identified apps installed on the client device and (2) assigning each of the unknown apps 112b-112d with an app suspicion score based on the device suspicion scores.

For example, as disclosed in round 1 of the table 202, the privacy app 116 may assign the client device 104a a device suspicion score of 1, which is equal to the maximum app suspicion score of the app 112a installed on the client device 104a. Further, during round 1, the privacy app 116 may assign the client devices 104b and 104c a device suspicion score of 0, which is equal to the maximum app suspicion score of all of the apps (e.g., the apps 112b, 112c, and 112d) installed on the client devices 104b and 104c.

Then, also during round 1, the privacy app 116 may assign the unknown apps 112b-112d with app suspicion scores based on the device suspicion scores of the client devices 104a-104n. In some embodiments, the assigning of the app suspicion scores may include assigning each unknown app with an app suspicion score equal to an average device suspicion score of the client device(s) upon which the unknown app is installed. For example, the privacy app 116 may assign, during round 1, the unknown apps 112b and 112c with an app suspicion score of 0.5, which is equal to an average device suspicion score of the client devices 104a and 104b upon which the unknown apps 112b and 112c are installed (i.e., the client device 104a has a device suspicion score of 1, and the client device 104b has a device suspicion score of 0, so the average device suspicion score is 0.5). Further, the privacy app 116 may assign the unknown app 112d with an app suspicion score of 0.3333, which is equal to an average device suspicion score of the client device 104a, 104b, and 104c upon which the unknown app 112d are installed (i.e., the client device 104a has a device suspicion score of 1, and the client devices 104b and 104c have a device suspicion score of 0, so the average device suspicion score is 0.3333).

Next, the privacy app 116 may repeat the two-step process of (1) assigning device suspicion scores and (1) assigning app suspicion scores (which may include normalization) until the device suspicion scores and the app suspicion scores converge within a convergence threshold (e.g., within four decimal places).

For example, as disclosed in round 2 of the table 202, the privacy app 116 may assign the client device 104a a device suspicion score of 1, which is equal to the maximum app suspicion score of the app 112a installed on the client device 104a. Further, during round 2, the privacy app 116 may assign the client device 104b a device suspicion score of 0.5, which is equal to the maximum app suspicion score of all of the apps (e.g., the apps 112b, 112c, and 112d) installed on the client device 104b. Also, during round 2, the privacy app 116 may assign the client device 104c a device suspicion score of 0.3333, which is equal to the maximum app suspicion score of all of the apps (e.g., the app 112d) installed on the client device 104c.

Then, also during round 2, the privacy app 116 may assign the unknown apps 112b-112d with app suspicion scores based on the device suspicion scores of the client devices 104a-104n. For example, the privacy app 116 may assign, during round 2, the unknown apps 112b and 112c with a raw app suspicion score of 0.75, which is equal to an average device suspicion score of the client device 104a and 104b upon which the unknown apps 112b and 112c are installed (i.e., the client device 104a has a device suspicion score of 1, and the client device 104b has a device suspicion score of 0.5, so the raw average device suspicion score is 0.75). Further, the privacy app 116 may assign the unknown app 112d with a raw app suspicion score of 0.61111111, which is equal to an average device suspicion score of the client device 104a, 104b, and 104c upon which the unknown app 112d is installed (i.e., the client device 104a has a device suspicion score of 1, and the client device 104b has a device suspicion score of 0.5, and the client device 104c has a device suspicion score of 0.3333, so the average device suspicion score is 0.61111111).

These raw app suspicion scores may then be normalized. In some embodiments, the normalization may result in a sum of the app suspicion scores assigned during each repeat performance of the assigning of the app suspicion scores to unknown apps being equal to a sum of the app suspicion scores assigned during the initial assigning of app suspicion scores to unknown apps. For example, the normalization of the raw app suspicion scores of 0.75, 0.75, and 0.61111111 of the unknown apps 112b, 112c, and 112d during round 2 may result in a sum of the app suspicion scores during round 2 being equal to a sum of the app suspicion scores assigned during the initial assigning of app suspicion scores to the unknown apps 112b, 112c, and 112d during round 1, which sum during round 1 equaled 1.33333333. Therefore, the raw app suspicion scores of 0.75, 0.75, and 0.61111111 of the unknown apps 112b, 112c, and 112d during round 2 may be normalized to 0.4737, 0.4737, and 0.386 so that their sum equals 1.33333333.

Then, because the device suspicion scores and the app suspicion scores did not converge within a convergence threshold (e.g., within four decimal places) between round 1 and round 2, the two-step process of (1) assigning device suspicion scores and (1) assigning app suspicion scores (which may include normalization) may be repeated for round 3, round 4, round 5, round 6, round 7, and round 8. Then, because the device suspicion scores and the app suspicion scores did converge within a convergence threshold (e.g., within four decimal places) between round 7 and round 8, this two-step process may terminate.

Next, the privacy app 116 may attempt to remove false positives in the app suspicion scores by throwing out the app suspicion scores arrived at in the final round of the two-step process for unknown apps, and recalculating the app suspicion scores for unknown apps using the device suspicion scores from the final round.

In some embodiments, this assigning of the app suspicion scores may include assigning each unknown app with an app suspicion score equal to a fraction that includes a numerator based on a sum of the device suspicion scores of the client devices upon which the unknown app is installed and a denominator based on a number of the client devices upon which the unknown app is installed. In some embodiments, this fraction may be expressed as follows:

$$\frac{\alpha + \text{hits} - 1}{\alpha + \beta + \text{trials} - 2}$$

where:

$\alpha$=a constant that is computed to generally be lower than $\beta$ to reflect a general skepticism that most apps are malicious, β=a constant that is computed to generally be higher than α to reflect a general skepticism that most apps are malicious, hits=a sum of the device suspicion scores of the client devices upon which the unknown app is installed, and trials=a number of the client devices upon which the unknown app is installed.

This fraction may be determined using an Empirical Bayes Estimation, and may represent a mode. Use of this fraction may represent an attempt to fit app suspicion scores to the base rate of surveillance apps and to fit a prior distribution to that base rate. Use of this fraction may also represent an attempt to use a maximum a posteriori estimate, which calculates the posterior probability distribution as a combination of prior belief and evidence. In one example of this fraction, α may be equal to 1.1, while β is equal to 185. With these values of α and β, apps which are installed more frequently and have a high app suspicion score will be weighted more heavily than apps which are installed less frequently and have the same high app suspicion score. This may avoid false positives with apps that are installed less frequently.

For example, a prior belief may that most apps are not malicious. The values of the constants α and β may then be modeled based on this prior belief. Thus, where a probability distribution function is defined between 0 and 1, the values of α and β will cause the curve of the function to take different shapes. For example, a rough estimate may be used to determine how suspicious apps are in general, and then the values of α and β may be chosen to best fit the rough estimate. Therefore, in general, if the value of a is relatively small and the value of β is relatively large, then curve of the function will be skewed toward a value of 0. Conversely, if the value of a is relatively large and the value of β is relatively small, then the curve of the function will be skewed toward a value of 1. Ultimately, if the prior belief is that most apps are not malicious, a relatively large value of a and a relatively small value of β may introduce skepticism into the function that most apps are malicious and may help avoid false positives.

Using the equation above on the device suspicion score that were calculated in the final round of the two-step process (i.e., round 8), for the unknown app 112$b$, the hits would equal 1.4684, which is the sum of the device suspicion scores of the client devices 104$a$ and 104$b$ upon which the unknown app 112$b$ is installed (i.e., the client device 104$a$ has a device suspicion score of 1, and the client device 104$b$ has a device suspicion score of 0.4684, so the sum of these device suspicion scores is 1.4684), and the trials would equal 2, which is the number of the two client devices 104$a$ and 104$b$ upon which the unknown app 112$b$ is installed, thus resulting in the privacy app 116 assigning the unknown app 112$b$ with an app suspicion score of:

$$\frac{1.1 + 1.4684 - 1}{1.1 + 185 + 2 - 2} = \frac{1.5684}{186.1} = 0.008428$$

Using the equation above on round 8 for the unknown app 112$c$, the app suspicion score would also be 0.008428 since the unknown app 112$c$ is installed on the same client devices as the unknown app 112$b$. Using the equation above on round 8 for the unknown app 112$d$, the hits would equal 1.865, which is the sum of the device suspicion scores of the client devices 104$a$, 104$b$, and 104$c$ upon which the unknown app 112$d$ is installed (i.e., the client device 104$a$ has a device suspicion score of 1, the client device 104$b$ has a device suspicion score of 0.4684, and the client device 104$c$ has a device suspicion score of 0.3966, so the sum of these device suspicion scores is 1.865), and the trials would equal 3, which is the number of the three client devices 104$a$, 104$b$, and 104$c$ upon which the unknown app 112$d$ is installed, thus resulting in the privacy app 116 assigning the unknown app 112$d$ with an app suspicion score of:

$$\frac{1.1 + 1.865 - 1}{1.1 + 185 + 3 - 2} = \frac{1.965}{187.1} = 0.010502$$

In some embodiments, the use of a fraction, such as a fraction that is determined using an Empirical Bayes Estimation, may be employed to assign app suspicion scores not after the two-step process disclosed above, but instead during each round of the two-step process. For example, this fraction may be employed in place of the assigning of the app suspicion scores that are equal to the average device suspicion score of the client device(s) upon which the unknown app is installed.

For example, during round 1 in the chart 202, using the equation above on round 1 for the unknown app 112$b$, the hits would equal 1, which is the sum of the device suspicion scores of the client devices 104$a$ and 104$b$ upon which the unknown app 112$b$ is installed (i.e., the client device 104$a$ has a device suspicion score of 1, and the client device 104$b$ has a device suspicion score of 0, so the sum of these device suspicion scores is 1), and the trials would equal 2, which is the number of the two client devices 104$a$ and 104$b$ upon which the unknown app 112$b$ is installed, thus resulting in the privacy app 116 assigning the unknown app 112$b$ with an app suspicion score of:

$$\frac{1.1 + 1 - 1}{1.1 + 185 + 2 - 2} = \frac{1.1}{186.1} = 0.005911$$

Using the equation above on round 1 for the unknown app 112$c$, the app suspicion score would also be 0.0086 since the unknown app 112$c$ is installed on the same client devices as the unknown app 112$b$. Using the equation above on round 1 for the unknown app 112$c$, the hits would equal 1, which is the sum of the device suspicion scores of the client devices 104$a$, 104$b$, and 104$c$ upon which the unknown app 112$d$ is installed (i.e., the client device 104$a$ has a device suspicion score of 1, and the client devices 104$b$ and 104$c$ have a device suspicion score of 0, so the sum of these device suspicion scores is 1), and the trials would equal 3, which is the number of the three client devices 104$a$, 104$b$, and 104$c$ upon which the unknown app 112$d$ is installed, thus resulting in the privacy app 116 assigning the unknown app 112$d$ with an app suspicion score of:

$$\frac{1.1 + 1 - 1}{1.1 + 185 + 3 - 2} = \frac{1.1}{187.1} = 0.005879$$

After the final app suspicion scores are assigned, the privacy app 116 may identify one or more of the unknown apps as a surveillance app based on the app suspicion score of the unknown app exceeding a suspicion threshold (e.g., a suspicion threshold of the top 0.05% of app suspicion scores) and, in response, protect against the surveillance app by directing performance, at one of the client devices upon which the surveillance app is installed, of a remedial action to protect the client device from the surveillance app.

Therefore, the privacy app 116 may identify and protect against surveillance apps installed on the client devices 104a-104n. This identification may be more accurate than was possible using conventional methods. This more accurate detection of surveillance apps installed on the client devices 104a-104n can enable remedial actions to be taken to protect these client devices 104a-104n, and their users, from abusers being able to access and exploit surveillance data obtained from surveillance apps.

Modifications, additions, or omissions may be made to the table 202 and/or the chart 204 of FIG. 2 without departing from the scope of the present disclosure. In some embodiments, the table 202 and/or the chart 204 may include additional components similar to the components illustrated in FIG. 2 that each may be configured similarly to the components illustrated in FIG. 2.

Figure 3:
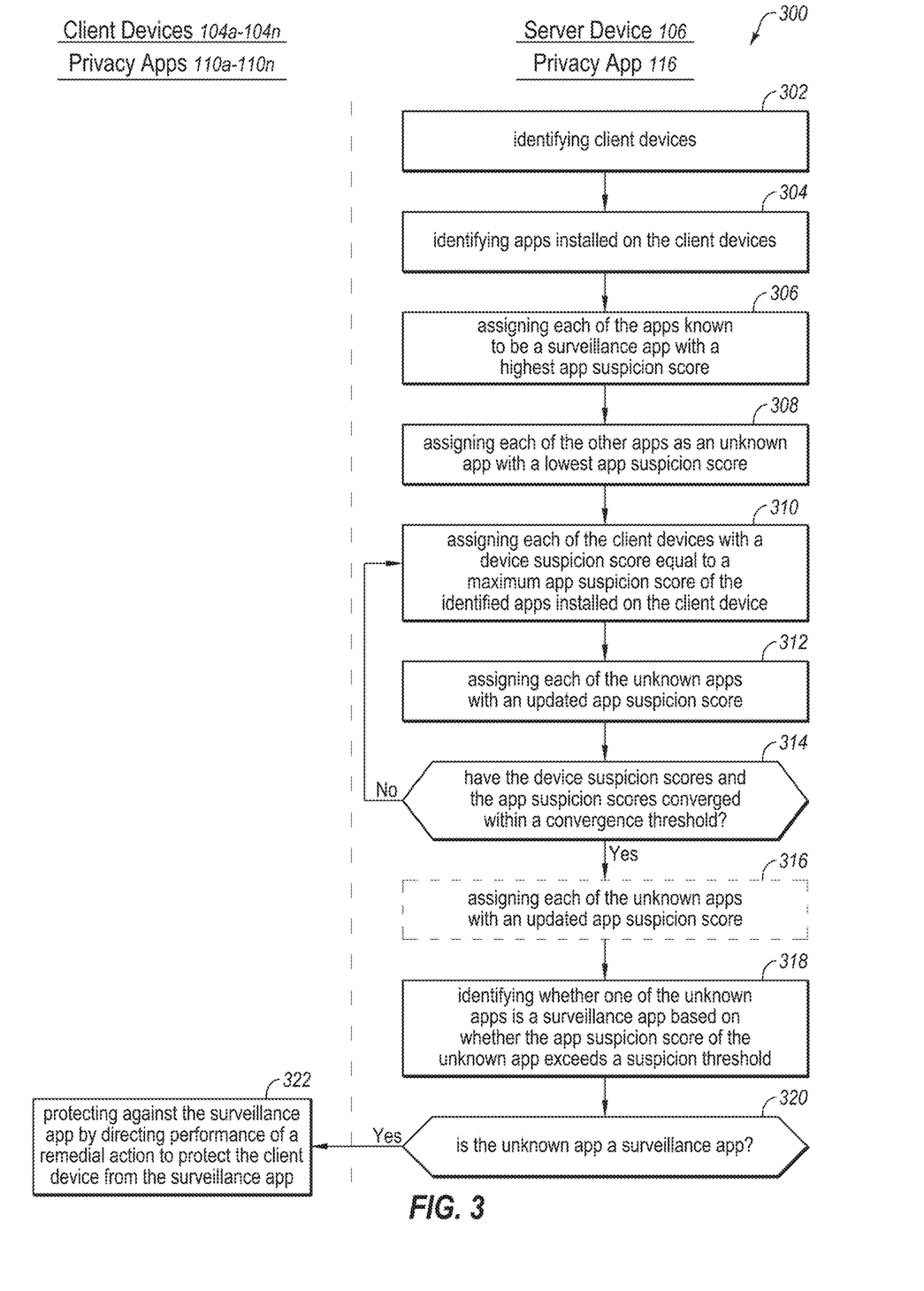
FIG. 3 is a flowchart of an example method for identifying and protecting against surveillance apps installed on client devices.

FIG. 3 is a flowchart of an example method 300 for identifying and protecting against surveillance apps installed on client devices. The method 300 may be performed, in some embodiments, by one or more applications, devices, or systems, such as by the privacy apps 110a-110n and 116 of FIG. 1, or some other app(s) or application(s), or some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, identifying client devices. For example, the privacy app 116 may identify, at action 302, the client devices 104a-104n. In some embodiments, the client devices 104a-104n may be identified due to the client devices 104a-104n having privacy apps 110a-110n installed thereon.

The method 300 may include, at action 304, identifying apps installed on the client devices. For example, the privacy app 116 may identify, at action 304, the installed apps 112a-112n that are installed on the client devices 104a-104n.

The method 300 may include, at action 306, assigning each of the apps known to be a surveillance app with a highest app suspicion score. For example, the privacy app 116 may assign, at action 306, the installed app 112a with a highest app suspicion score of 1, in round 0 of the table 202, due to the installed app 112a being known to be a surveillance app. The installed app 112a may be identified as being a known surveillance app by comparing it to the list of known surveillance apps 119 in the surveillance database 118 on the server device 106.

The method 300 may include, at action 308, assigning each of the other apps as an unknown app with a lowest app suspicion score. For example, the privacy app 116 may assign, at action 308, the installed apps 112b, 112c, and 112d with a lowest app suspicion score of 0, in round 0 of the table 202, due to it being unknown whether the installed apps 112b, 112c, and 112d are surveillance apps.

The method 300 may include, at action 310, assigning each of the client devices with a device suspicion score equal to a maximum app suspicion score of the identified apps installed on the client device. For example, during round 1 of the table 202, the privacy app 116 may assign, at action 310, the client device 104a a device suspicion score of 1, which is equal to the maximum app suspicion score of the app 112a installed on the client device 104a. Further, during round 1, the privacy app 116 may assign, at action 310, the client devices 104b and 104c a device suspicion score of 0, which is equal to the maximum app suspicion score of all of the apps (e.g., the apps 112b, 112c, and 112d) installed on the client devices 104b and 104c.

The method 300 may include, at action 312, assigning each of the unknown apps with an updated app suspicion score. For example, during round 1 of the table 202, the privacy app 116 may assign, at action 312, the unknown apps 112b-112d with app suspicion scores.

In some embodiments, the assigning of the app suspicion scores at action 312 may include assigning each unknown app with an app suspicion score equal to an average device suspicion score of the client device(s) upon which the unknown app is installed. For example, the privacy app 116 may assign, during round 1, the unknown apps 112b and 112c with an app suspicion score of 0.5, which is equal to an average device suspicion score of the client device 104a and 104b upon which the unknown apps 112b and 112c are installed (i.e., the client device 104a has a device suspicion score of 1, and the client device 104b has a device suspicion score of 0, so the average device suspicion score is 0.5). Further, the privacy app 116 may assign the unknown app 112d with an app suspicion score of 0.3333, which is equal to an average device suspicion score of the client device 104a, 104b, and 104c upon which the unknown app 112d is installed (i.e., the client device 104a has a device suspicion score of 1, and the client devices 104b and 104c have a device suspicion score of 0, so the average device suspicion score is 0.3333).

Alternatively, in some embodiments, the assigning of the app suspicion scores at action 312 may include assigning each unknown app with an app suspicion score equal to a fraction that includes a numerator based on a sum of the device suspicion scores of the client devices upon which the unknown app is installed and a denominator based on a number of the client devices upon which the unknown app is installed. In some embodiments, the fraction may include a fraction determined using an Empirical Bayes Estimation. Also, in some embodiments, the fraction may include a relatively small constant added to the numerator and a relatively large constant added to the denominator in order to avoid false positives. For example, using the equation discussed in connection with FIG. 2, the privacy app 116 may assign, during round 1, the unknown apps 112b and 112c with an app suspicion score of 0.005911, and the unknown app 112d with an app suspicion score of 0.005879.

The method 300 may include, at action 314, determining whether the device suspicion scores and the app suspicion scores converged within a convergence threshold. If so (yes at action 314), the method 300 may return to the action 310, and may repeat the actions 310, 312, and 314. If not (no at action 314), the method 300 may include an action 316. In some embodiments, repeating the action 312 may include repeating the action 312 with normalization. In these embodiments, the normalization performed during each repeat performance of action 312 may include normalizing the app suspicion scores assigned during each repeat performance of action 312 so that a sum of the app suspicion scores assigned during each repeat performance of action 312 is equal to a sum of the app suspicion scores assigned during an initial performance of action 312.

The method 300 may include, at action 316, assigning each of the unknown apps with an updated app suspicion score. In some embodiments, the assigning at action 316 may include assigning each unknown app with an app suspicion score equal to a fraction that includes a numerator based on a sum of the device suspicion scores of the client devices upon which the unknown app is installed and a denominator based on a number of the client devices upon which the unknown app is installed. In some embodiments, the fraction may include a fraction determined using an Empirical Bayes Estimation. For example, using the equation discussed in connection with FIG. 2, the privacy app 116 may assign, after conclusion of the round 8 of the table 202, the unknown apps 112b and 112c with an app suspicion score of 0.008428, and the unknown app 112d with an app suspicion score of 0.010502.

The method 300 may include, at action 318, identifying whether one of the unknown apps is a surveillance app based on whether the app suspicion score of the unknown app exceeds a suspicion threshold. If so (yes at action 320), the method 300 may include, at action 322, protecting against the surveillance app by directing performance of a remedial action to protect the client device from the surveillance app. In some embodiments, the suspicion threshold may include a threshold in a ranking of the app suspicion scores of the unknown apps. In some embodiments, the performing of the remedial action may include one or more of blocking the client device from accessing a network, rolling back one or more changes at the client device that were made by the surveillance app, quarantining the surveillance app on the client device, uninstalling the surveillance app from the client device, or temporarily freezing activity at the client device, or some combination thereof. For example, the privacy app 116 may identify, at action 318, that the unknown app 112b is a surveillance app based on the app suspicion score of the unknown app 112b exceeding a suspicion threshold. As such, the privacy app 116 may protect, at action 322, against the surveillance app 112b by directing performance of a remedial action to protect the client device 104b (upon which the surveillance app 112b is installed) from the surveillance app 112b. In this example, the remedial action may include blocking the client device 104b from accessing the network 102, rolling back one or more changes at the client device 104b that were made by the surveillance app 112b, quarantining the surveillance app 112b on the client device 104b, uninstalling the surveillance app 112b from the client device 104b, or temporarily freezing activity at the client device 104b, or some combination thereof.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 302-314 may be performed without performing other actions of the method 300. Also, in some embodiments, actions 302-316 may be performed without performing other actions of the method 300. Also, in some embodiments, actions 316 may be eliminated from the method 300. Further, in some embodiments, any of action 318, action 320, or action 322 may be performed by a network administrator or other entity that is different from the entity or entities performing the other actions of the method 300.

Further, it is understood that the method 300 may improve the functioning of a client device itself, and may improve the technical field of surveillance app identification and remediation. For example, the functioning of the client devices 104a-104n may themselves be improved by the method 300, by identifying and protecting against unknown surveillance apps installed on the client devices 104a-104n. This identification may be more accurate than was possible using conventional methods. This more accurate detection of surveillance apps installed on the client devices 104a-104n can enable remedial actions to be taken to protect these client devices 104a-104n, and their users, from abusers being able to access and exploit surveillance data obtained from surveillance apps.

FIG. 4 illustrates an example computer system 400 that may be employed in identifying and protecting against surveillance apps installed on client devices. In some embodiments, the computer system 400 may be part of any of the systems or devices described in this disclosure. For example, the computer system 400 may be part of any of the client devices 104a-104n, the server device 106, or the malicious network device 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIG. 3. These computer-executable instructions may be included, for example, in the operating system 410, in one or more applications, such as in any of the privacy apps 110a-110n or 116, the installed apps 112a-112n, or the malicious app 120 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIG. 3. In some embodiments, the application 414 may be part of the operating system 410 or may be part of an application of the computer system 400, or may be some combination thereof. In some embodiments, the application 414 may function as any of the privacy apps 110a-110n or 116, the installed apps 112a-112n, or the malicious app 120 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against malicious apps installed on client devices, at least a portion of the method being performed by a computer device comprising one or more processors, the method comprising:
   (a) identifying client devices;
   (b) identifying apps installed on the client devices;
   (c) assigning each of the apps known to be a malicious app with a highest app suspicion score;
   (d) assigning each of the other apps as an unknown app with a lowest app suspicion score;
   (e) assigning each of the client devices with a device suspicion score equal to a maximum app suspicion score of the identified apps installed on the client device;
   (f) assigning each of the unknown apps with an initially updated app suspicion score equal to an average device suspicion score of the client device(s) upon which the unknown app is installed;
   (g) identifying a sum of the initially updated app suspicion scores;
   (h) assigning each of the client devices with a revised device suspicion score equal to a new maximum app suspicion score of the identified apps installed on the client device;
   (i) assigning each of the unknown apps with a subsequently updated app suspicion score, wherein the subsequently updated app suspicion score is based on an average of the revised device suspicion scores upon which each of the unknown apps is installed, and wherein the subsequently updated app suspicion scores include a normalization that results in a sum of the subsequently updated app suspicion scores to be equal to the sum of the initially updated app suspicion scores;
   (j) repeating (h) and (i) until the device suspicion scores and the app suspicion scores converge within a convergence threshold;
   (k) in response to one of the unknown apps having an app suspicion score that exceeds a suspicion threshold, identifying the unknown app as a malicious app; and
   (l) in response to identifying the malicious app, protecting against the malicious app by directing performance, at one of the client devices upon which the malicious app is installed, of a remedial action to protect the client device from the malicious app.

2. The method of claim 1, wherein the performing, at one of the client devices upon which the malicious app is installed, of a remedial action comprises one or more of blocking the client device from accessing a network, rolling back one or more changes at the client device that were made by the malicious app, quarantining the malicious app on the client device, uninstalling the malicious app from the client device, or temporarily freezing activity at the client device, or some combination thereof.

3. The method of claim 1, wherein:
   the highest app suspicion score is 1; and
   the lowest app suspicion score is 0.

4. The method of claim 3, wherein the convergence threshold is four decimal places.

5. The method of claim 1, wherein the suspicion threshold comprises a threshold in a ranking of the app suspicion scores of the unknown apps.

6. A computer-implemented method for identifying and protecting against malicious apps installed on client devices, at least a portion of the method being performed by a computer device comprising one or more processors, the method comprising:
   (a) identifying client devices;
   (b) identifying apps installed on the client devices;
   (c) assigning each of the apps known to be a malicious app with a highest app suspicion score;
   (d) assigning each of the other apps as an unknown app with a lowest app suspicion score;
   (e) assigning each of the client devices with a device suspicion score equal to a maximum app suspicion score of the identified apps installed on the client device;
   (f) assigning each of the unknown apps with an initially updated app suspicion score equal to a first fraction that comprises a first numerator based on a sum of the device suspicion scores of the client devices upon which the unknown app is installed and a first denominator based on a number of the client devices upon which the unknown app is installed;
   (g) identifying a sum of the initially updated app suspicion scores;
   (h) assigning each of the client devices with a revised device suspicion score equal to a new maximum app suspicion score of the identified apps installed on the client device;
   (i) assigning each of the unknown apps with a subsequently updated app suspicion score equal to a second fraction that comprises a second numerator based on a sum of the revised device suspicion scores of the client devices upon which the unknown app is installed and a second denominator based on a number of the client devices upon which the unknown app is installed, and wherein the subsequently updated app suspicion scores include a normalization that results in a sum of the subsequently updated app suspicion scores to be equal to the sum of the initially updated app suspicion scores;

(j) repeating (h) and (i), until the device suspicion scores and the app suspicion scores converge within a convergence threshold;

(k) in response to one of the unknown apps having an app suspicion score that exceeds a suspicion threshold, identifying the unknown app as a malicious app; and (l) in response to identifying the malicious app, protecting against the malicious app by directing performance, at one of the client devices upon which the malicious app is installed, of a remedial action to protect the client device from the malicious app.

7. The method of claim 6, wherein the performing, at one of the client devices upon which the malicious app is installed, of a remedial action comprises one or more of blocking the client device from accessing a network, rolling back one or more changes at the client device that were made by the malicious app, quarantining the malicious app on the client device, uninstalling the malicious app from the client device, or temporarily freezing activity at the client device, or some combination thereof.

8. The method of claim 6, wherein:
the highest app suspicion score is 1; and
the lowest app suspicion score is 0.

9. The method of claim 6, wherein the first and second fractions further comprise a first constant added to the first and second numerators and a second constant added to the first and second denominators in order to avoid false positives, wherein the first constant is smaller than the second constant.

10. The method of claim 6, wherein the suspicion threshold comprises a threshold in a ranking of the app suspicion scores of the unknown apps.

11. The method of claim 6, wherein the first and second fractions are determined using an Empirical Bayes Estimation.

12. A computer-implemented method for identifying and protecting against surveillance apps installed on client devices, at least a portion of the method being performed by a computer device comprising one or more processors, the method comprising:

(a) identifying client devices;

(b) identifying apps installed on the client devices;

(c) assigning each of the apps known to be a surveillance app with a highest app suspicion score;

(d) assigning each of the other apps as an unknown app with a lowest app suspicion score;

(e) assigning each of the client devices with a device suspicion score equal to a maximum app suspicion score of the identified apps installed on the client device;

(f) assigning each of the unknown apps with an initially updated app suspicion score equal to an average device suspicion score of the client device(s) upon which the unknown app is installed;

(g) identifying a sum of the initially updated app suspicion scores;

(h) assigning each of the client devices with a revised device suspicion score equal to a new maximum app suspicion score of the identified apps installed on the client device;

(i) assigning each of the unknown apps with a subsequently updated app suspicion score equal to a fraction that includes a numerator based on a sum of the revised device suspicion scores of the client devices upon which the unknown app is installed and a denominator based on a number of the client devices upon which the unknown app is installed, and wherein the subsequently updated app suspicion scores include a normalization that results in a sum of the subsequently updated app suspicion scores to be equal to the sum of the initially updated app suspicion scores;

(j) repeating (h) and (i), until the device suspicion scores and the app suspicion scores converge within a convergence threshold;

(k) in response to one of the unknown apps having an app suspicion score that exceeds a suspicion threshold, identifying the unknown app as a surveillance app; and (l) in response to identifying the surveillance app, protecting against the surveillance app by directing performance, at one of the client devices upon which the surveillance app is installed, of a remedial action to protect the client device from the surveillance app.

13. The method of claim 12, wherein the performing, at one of the client devices upon which the surveillance app is installed, of a remedial action comprises one or more of blocking the client device from accessing a network, rolling back one or more changes at the client device that were made by the surveillance app, quarantining the surveillance app on the client device, uninstalling the surveillance app from the client device, or temporarily freezing activity at the client device, or some combination thereof.

14. The method of claim 12, wherein:
the highest app suspicion score is 1; and
the lowest app suspicion score is 0.

15. The method of claim 14, wherein the fraction of (i) further comprises a first constant added to the numerator and a second constant added to the denominator in order to avoid false positives, wherein the first constant is smaller than the second constant.

16. The method of claim 12, wherein the suspicion threshold comprises a threshold in a ranking of the app suspicion scores of the unknown apps.

17. The method of claim 12, wherein the fraction comprises a fraction determined using an Empirical Bayes Estimation.

* * * * *